United States Patent [19]
Roskoni

[11] Patent Number: 4,980,633
[45] Date of Patent: Dec. 25, 1990

[54] METHOD AND APPARATUS FOR MEASURING A VEHICLE'S OWN SPEED BY THE DOPPLER RADAR PRINCIPLE

[75] Inventor: Ulrich Roskoni, Wöllstadt, Fed. Rep. of Germany

[73] Assignee: VDO Adolf Schindling AG, Frankfurt am Main, Fed. Rep. of Germany

[21] Appl. No.: 488,337

[22] Filed: Mar. 2, 1990

[30] Foreign Application Priority Data

Mar. 23, 1989 [DE] Fed. Rep. of Germany ....... 3909644

[51] Int. Cl.$^5$ .............................................. G01S 13/60
[52] U.S. Cl. .................................... 342/115; 342/117
[58] Field of Search .................. 342/70, 115, 114, 117

[56] References Cited

U.S. PATENT DOCUMENTS

| | | | |
|---|---|---|---|
| 4,635,059 | 1/1987 | Ball | 342/ |
| 4,728,954 | 3/1988 | Phelan et al. | 342/ |
| 4,818,999 | 4/1989 | Kobayashi et al. | 342/ |

Primary Examiner—Thomas H. Tarcza
Assistant Examiner—Mark Hellner
Attorney, Agent, or Firm—Martin A. Farber

[57] ABSTRACT

A method for measuring a vehicle's own speed by the Doppler radar principle, in accordance with which microwaves of a transmission frequency are sent out by the vehicle, a part thereof being reflected back and mixed with the microwave signal at transmission frequency. In this way Doppler signals are produced which, after pulse formation, are evaluated as Doppler pulse signals by a frequency measurement in the time range plus direction-of-travel evaluation, so as to form digital Doppler signal values. For the determination of a mean Doppler period in each case, a median $M(n-3)$ is continuously determined from a predetermined number of the last generated digital Doppler signal values of the sequence $M(n-1)$, $M(n-2)$, $M(n-3)$, $M(n-4)$, $M(n-5)$.

7 Claims, 4 Drawing Sheets

METHOD AND APPARATUS FOR MEASURING A VEHICLE'S OWN SPEED BY THE DOPPLER RADAR PRINCIPLE

FIELD AND BACKGROUND OF THE INVENTION

The present invention relates generally to a method of measuring a vehicle's own speed by the Doppler radar principle.

In particular, the invention relates to a method of measuring a vehicle's own speed by the Doppler radar principle, in accordance with which microwaves are sent out at a transmission frequency by the vehicle. A portion of the microwave energy is reflected back to the vehicle at a receiving frequency. Upon reception at the vehicle, the received signal is mixed with a sample of the transmitted signal to produce a mixed signal, whereby Doppler frequencies are obtained. After pulse formation, the mixed signals are evaluated as Doppler pulse signals by a frequency measurement in the time range and in accordance with direction-of-travel, in order to form digital Doppler signal values.

A further aspect of the invention relates to a corresponding device for the measurement of the own speed of a vehicle having a Doppler radar sensor located on the vehicle. The device has a mixer which is fed with microwaves of the transmitted frequency and with microwaves received by the Doppler radar sensor. The device includes a pulse-former connected to an output of the mixer, a period measuring device which is connected behind the pulse-former and produces one digital Doppler frequency value for each digitalized period, and an evaluation device which is connected behind the period measuring device to obtain a mean value for the speed sought from a predetermined number of Doppler frequency values.

As is known, the measurement of a vehicle's own speed by the Doppler radar principle is based on the fact that a difference frequency occurs between the frequency of a wavefront transmitted by the vehicle—transmission signal—and the wavefront reflected by the ground, with respect to which the vehicle moves, in particular, horizontally, and received again by the vehicle. The difference frequency is proportional to the relative movement of the vehicle with respect to the ground. By the terms "Doppler signal" and "Doppler frequency" there is always to be understood in the present application the signal with the difference frequency.

For the technical practice out of the method, a radar module which comprises an oscillator—a Gunn oscillator—a circulator, a mixer, an antenna—horn radiator—and a directional coupler can be used. The oscillator produces the high-frequency signal oscillation which is fed to the antenna via the circulator. The antenna radiates this energy into space and, in particular, in the direction toward the ground over which the vehicle is travelling. The wave reflected on the ground is received again by the antenna, and the corresponding received signal is fed to the mixer via the circulator. A part of the transmission energy is furthermore fed to the mixer via the directional coupler, so that the received signal and the transmitted signal are superimposed on each other. A mixing process takes place in the mixer—mixer diode—which is acted on by the transmitted signal and the received signal, the mixing process forming, inter alia, the Doppler signal as difference frequency between the frequency of the transmitted wave and the frequency of the received reflected wave. The Doppler signal is made available via an amplifier for further processing.

In practical devices for measuring the own speed of a vehicle by the Doppler principle, there occurs as Doppler frequency not only a single difference frequency but a Doppler spectrum even upon measurement of the speed by means of only a single point of reflection. In the case of ground which is present in actual practice, such as asphalt surfaces or tilled land, which can be approximated by a random distribution of points of reflection of differenct reflection factors, the detectable Doppler signal is in addition disturbed by amplitude quenchings and phase jumps. Such a Doppler spectrum exhibits an irregular distribution of the amplitude as a function of the frequency, which is furthermore not constant with time. Variations can be noted, in particular, of the maximum on the frequency axis.

The vehicle speed determined in accordance with the above principle of measurement is thus subject to a large measurement error.

In order to reduce this measurement error, there is already known a Doppler radar speed indicator having a pulse-width discriminator which is intended to determine the maximum of the distribution curve of the Doppler signal or the Doppler frequency spectrum (West German Patent No. 32 19 819). That speed indicator comprises a Doppler radar sensor which is fastened on the vehicle, transmits microwaves, and receives a part of the waves reflected by the ground and mixes them with a part of the transmitted waves. The Doppler signals produced in this manner are amplified in an amplifying and pulse-forming device and a Doppler pulse signal is produced. The Doppler pulse signal is converted into a digital Doppler signal in a period counter. The output of the period counter serves as address for a storage for the evaluation of the digital Doppler signals. An adder increments by one the content of the storage under each controlled address for each Doppler pulse signal applied until a predetermined number of digital Doppler pulse signals has been completely incremented. Upon the occurrence of the nth Doppler pulse signal, the above-mentioned pulse-width discriminator determines the address assigned to the storage content n/2 as measure of the speed sought.

This known Doppler radar speed meter however has the disadvantage that, in order to obtain sufficient accuracy, the digital Doppler signals must be measured and evaluated over long periods of time if the number of n Doppler pulse signals is not to be too small and, thus the determination of the Doppler frequency (which is also known as center frequency) which corresponds to the speed of the vehicle, imprecise. The measurement and evaluation of the Doppler signals, however, takes place at the expense of the dynamic nature of the process and of the Doppler radar speed meter operating in accordance therewith. This deficient dynamic nature is particularly disturbing when it is to operate in combination with an anti-locking brake device.

In order to reduce the spectrum of the reflected radiation and thus decrease the integration time for the determination of a mean Doppler frequency which corresponds to the own speed of the land vehicle, a special antenna developed as slot antenna wave guide, is already known (West German patent No. 22 37 139). The slot antenna wave guide is aligned with its longitudinal axis parallel to the direction of the velocity vector and with its broad sides transverse thereto, parallel to the surface of the earth. It is provided, in addition, in its lower broad side with a longitudinal slot for the radar oscillations which extends somewhat outside the center of the broad side. In order to avoid a further distortion or broadening of the Doppler spectrum which can occur upon pitching motions of the vehicle, a two-channel Doppler radar device is known (West German Patent 22 37 139), in which, with two mixers, one Doppler signal is formed from the radiation in the direction of travel and one Doppler signal from the radiation opposite the direction of travel. The two signals are combined with each other upon the evaluation.

It is further known in this connection to compensate by a correction signal for an error in the Doppler signal due to vertical oscillations or changes in the distance of the vehicle from the ground. For this purpose an additional mixer having a diode is used which receives a quasi-optically mirrored radar radiation which is not subject to a Doppler shift but changes its phase position as a function of the distance of the antenna from the ground. The mixing of the so-called mirrored radiation with the residual signal of the transmitter remaining in the wave guide results in a low-frequency oscillation with which the error occurring upon the measurement of the Doppler signal can be compensated for. The above measures for increasing the accuracy of the measured Doppler frequency increase the expense and can limit the possibility of using the measurement principle, or they are only suitable to compensate for certain causes of distortion of the measured Doppler signals.

The object of the present invention is rapidly and accurately to determine a Doppler frequency which corresponds to the vehicle's own speed, even from irregular, strongly fluctuating Doppler spectra. No great additional expense is to be required for the corresponding evaluation of the Doppler signals.

SUMMARY OF THE INVENTION

According to the invention, a median $M(n-3)$ is continuously determined from a predetermined number of last-generated digital Doppler signal values of a sequence $M(n-1)$, $M(n-2)$, $M(n-3)$, $M(n-4)$, $M(n-5)$ in order to determine an average Doppler period (FIG. 3).

The method in accordance with the invention proceeds from Doppler signals which are evaluated in accordance with the period measurement method. In accordance with the period measurement method, digital Doppler signals are formed for the specific period measured.

In order to determine the mean Doppler frequency or a mean Doppler period which represents a measure of the speed of the vehicle, a median or central value is formed from a predetermined number of digital Doppler signal values of a sequence of such Doppler signal values. For the formation of the median, the digital Doppler signal value which lies in the center of a finite sequence of increasing Doppler signal values is determined and equated to the mean digital Doppler signal. The digital Dopper signal values must, therefore, first of all be sorted in accordance with this sequence. In this connection the extreme values of the measurement probes or of the individual Doppler signals lie at one of the ends of the finite sequence of numbers and do not affect the median determined, which is rather accurate even when based on only relatively few Doppler signal values. The method is accurate since phase jumps and/or partial suppression of the Doppler signals measured practically do not enter into the median if these disturbances do not occur too frequently. The possibility of using a method for measuring a vehicle's own speed by the Doppler radar principle is substantially promoted by the formation of a median. Since the median is only slightly delayed as compared with the digital Doppler signal values from which have been determined by sorting, this method is particularly suitable whenever rapid adjustments are to take place, for instance in an anti-locking brake device.

The dynamics of the method of the invention are high, in particular, for the reason that merely a relatively small number of Doppler signals is sufficient for the formation of a representative means value or median. This sliding formation of the median means that the median is not constantly formed from a number of completely new digital Doppler signals, rather, in each case, the last-formed digital Doppler signal is evaluated in combination with previously formed digital Doppler signals, of which there is the predetermined number. The variation in the mean Doppler period and thus in the relative error are reduced with an increase in the number of measured values, i.e. the number of Doppler signals produced last which are taken into account in the formation of the median.

If the median is formed from an odd number of the last digital Doppler signal values, then the middle Doppler signal value of the values sorted in ascending order is determined as median. However, if there is an even number of digital Doppler signal values which have be sorted in the sequence of ascending values, the two central Doppler signal values are sorted out for the formation of the median and processed as arithmetic mean value.

The method of the invention can be expanded in the manner that the Doppler signals formed from a two-channel measurement system are evaluated in order to reduce the influence of vertical movements of the vehicle and of pitching on the speed of the vehicle (in horizontal direction) formed from the Doppler signals. Two-channel measurement methods for measuring the speed of the vehicle itself by the Doppler principle are known per se; they are based on two radar heads, one of which radiates essentially in the direction of travel and the other in the opposite direction. The evaluation of the first and second Doppler signals which are formed from the waves reflected essentially in direction opposite the direction of travel and from the waves reflected essentially in the direction of travel, respectively, takes place in a method for measuring a vehicle's own speed by the Doppler principle. Therein, Doppler signals are produced by transmitting microwaves in the direction of travel. Reflected microwave signals are received and mixed with the microwave at the transmission frequency and are converted into first Doppler pulse signals. Second Doppler signals are produced by transmitting the microwaves in the direction opposite the direction of travel, receiving the reflected microwaves and mixing the received microwaves with the transmission frequency, to obtain the second Doppler pulse signals.

For the determination of a first mean Doppler period, in each case a first median (T1) from a predetermined number of first digital Doppler signal measurement values of a sequence, which have been generated last, is continuously determined. For the determination of a second mean Doppler period, in each case a second median (T2) from a predetermined number of last generated second digital Doppler signal measurement values is continuously sorted out. For the determination of the vehicle speed in the direction of travel, a mean Doppler period (T−J) is formed by the formation of the arithmetic mean from the first median value and the second median value.

By sorting out the first and second medians from the first and second Doppler signal measured values, the variations which are not due to changes in the vehicle's own speed are already substantially reduced. By the subsequent formation of the arithmetic mean from the two Doppler frequencies or from the first and second medians, the influence of errors due to vertical oscillations or pitching motions of the vehicle is furthermore substantially reduced. The mean value from the first median and the second median can then be processed further in customary manner so as to form the mean Doppler frequency and the speed of the vehicle from the mean Doppler period. The two-channel method with determination of first and second medians and subsequent formation of the mean value from the medians is particularly suitable for cases of operation in which the vertical speed remains less than the vehicle's own speed.

If the last-mentioned condition is not satisfied, i.e. if stronger vehicle vibrations and/or variations in height of the vehicle occur which exceed its own speed, then the measurement error can nevertheless be further reduced, while retaining the above-mentioned method for the evaluation of the first mean Doppler period and the second mean Doppler period. The wave which, in each case, is reflected to the radar antenna is mixed, in a quadrature mixer having two mixer diodes, with the oscillation produced by the oscillator.

The two mixer diodes are, for this purpose, shifted in location to the conductor to the antenna which is connected to the oscillator by one-eighth wavelength, ($\lambda/8$) or an odd multiple of $\lambda/8$. (With the same spacing the mixer diodes are thus at different distances from the reflecting target.) By the evaluation of the phase shift of the two Doppler signals which are formed at the two mixer diodes of the quadrature mixer, a change in direction of the Doppler frequency curves of the Doppler frequencies can be determined which are produced in the two mixer diodes by mixing.

In a two-channel method, two voltage signals can be produced for each channel, it being possible to determine the direction of movement of the vehicle from the phase angle between the two voltages of a channel. Signs for the first and second Doppler signal measured values can be formed from the phase angles so that these measured values can be evaluated with proper sign for the determination of the median. Thus the disturbing influences can also be compensated for if the vertical speed of the vehicle is greater than its own speed in horizontal direction.

For the carrying out of the method of the invention as set forth in the beginning of the summary of the invention hereinabove, there is provided a device for measuring a vehicle's own speed with a Doppler radar sensor arranged on it according to the third paragraph of this specification hereinabove, having an evaluation device (16) with a median filter. The inputs of the filter are acted on in sliding fashion by a continuous sequence of digital Doppler frequency measured values (T1, T2).

As has been explained above, by means of the median filter there is sorted out from a predetermined number of digital Doppler frequency measured values wherein the median value represents the mean Doppler frequency measured value of a spectrum and the vehicle's own speed. In case of an odd number of digital Doppler frequency measured values which are evaluated by the median filter, only one median is taken by the filter for further processing. In connection with the development of the median filter for the evaluation of an even number of digital Doppler frequency measured values, there are in this case concerned two (central) median values which are fed to an arithmetic-mean-value former in which the mean value is formed as a measure for the vehicle's own speed.

The median filter can also be designated a sorter since in it the number of digital Doppler frequency measured values is sorted in the sequence of their value i.e. of their preferably sign-evaluated amount. The median appears at the output of a comparator which filters out the Doppler frequency measured values located in the central position of the sequence of ascending values.

The device for this evaluation of the sequence of digital Doppler frequency measured values is characterized preferably by the fact that the median filter is connected to a shift register circuit (28–32) the input of which is acted on by the digital Doppler frequency measured values, and the shift register stages of which are shifted upon each measurement interval (measurement period) by one shift pulse. Also, the median filter comprises comparators, the inputs of which are so connected to the outputs of the shift register stages as well as to each other that they filter out the digital Doppler frequency measured value which represents the median value from the Doppler frequency measured values stored in the shift register stages. The shift register comprises in this connection a number of shift register stages which is equal to the predetermined number of digital Doppler frequency measurement values. The comparators from which the median filter is formed are provided, in particular, with two inputs to which the two digital Doppler frequency measured values which are to be compared are to be fed, and with two outputs with which the two Doppler frequency measured values fed are to be associated in accordance with the inner structure of the comparator as a function of the sign of the Doppler frequency measured values.

Instead of this uncomplicated construction of the sorter with the shift register which can be realized with little expense in a hardware realization of the invention, the median filter with the corresponding storage stages can also be realized by a microprocessor with a filter program.

Another feature of the invention is that a quadrature mixer is provided having two mixer diodes (4, 5) which are coupled, staggered by an odd-number multiple of $\lambda/8$ referred to the transmission frequency, on a conductor in the Doppler radar sensor (1 or 2) between the oscillator 49 and the antenna 50, and that two Doppler signals (A, B or C, D) of both mixer diodes are fed into a sign discriminator which generates a sign signal which corresponds to the phase relationship between the Doppler signals (A, B or C, D) which sign signal is fed together with the corresponding digital Doppler frequency value to the evaluation device 16 having the median filter.

This further feature for the measurement of own speed is particularly suitable for very slowly moving vehicles in which the Doppler signal is considerably distorted due to vehicle vibrations or variations in height caused in some other manner. This feature substantially eliminates these measurement errors in the manner that the direction of movement can be detected and sign-valued Doppler frequency measured values are accordingly formed which can be evaluated with the median filter. The median filter is, in this case, therefore developed in such a manner that the signs of the digital Doppler frequency measured values also are taken into account in order to form the sequence of Doppler frequency measured values of increasing value. A prerequisite for accounting for the direction of movement is a quadrature mixer, known per se, having two mixer diodes which are coupled, staggered by an odd-number multiple of $\lambda/8$, in terms of the transmission frequency, on a conductor in the Doppler radar sensor between the oscillator and the antenna. The two Doppler signals formed by the mixer diodes are fed to a sign discriminator which generates a sign signal which corresponds to the phase relationship between these two Doppler signals.

The sign discriminator comprises, in uncomplicated manner, type-D a flip-flop (12 or 13) having a static input (D) and a dynamic input, the inputs being connected in each case to one of the two mixer diodes (4, 5 or 6, 7) of the quadrature mixture.

According to another feature, the invention provides a device having a two-channel Doppler radar sensor with quadrature mixers, wherein in each channel one period measurement device (converter 14 or 15) each and one sign discriminator (D flip-flop 12 or 13) each are connected in front of an evaluation device 16 which comprises a median filter for each channel and the outputs of the median filters are connected to an arithmetic-means former, the mean value of which is a measure of the own speed (horizontal speed) sought.

The influeneces due to pitching and vertical movements of the vehicle are smallest with this two-channel device with quadrature mixers. The evaluation of the sign-valued digital Doppler frequency measured values takes place in this case again by one correspondingly developed median filter per channel and an arithmetic-mean former which is connected to the (median) outputs of the two median filters. In each of the two median filters, the median of the period of the Doppler signal measured values is formed in, in each case, one of the two channels. In the arithmetic-mean former there takes place the formation of the resultant period from both channels, which is also referred to as the period of the Janus Doppler frequency since the signal generation comes from two approximately oppositely directed antennas in a so-called Janus head.

BRIEF DESCRIPTION OF THE DRAWING

With the above and other objects and advantages in view, the present invention will become more clearly understood in connection with the detailed description of preferred embodiments, when considered with the accompanying drawing, of which.

DETAILED DESCRIPTION OF THE PREFERRED EMBODIMENT

Figure 1:
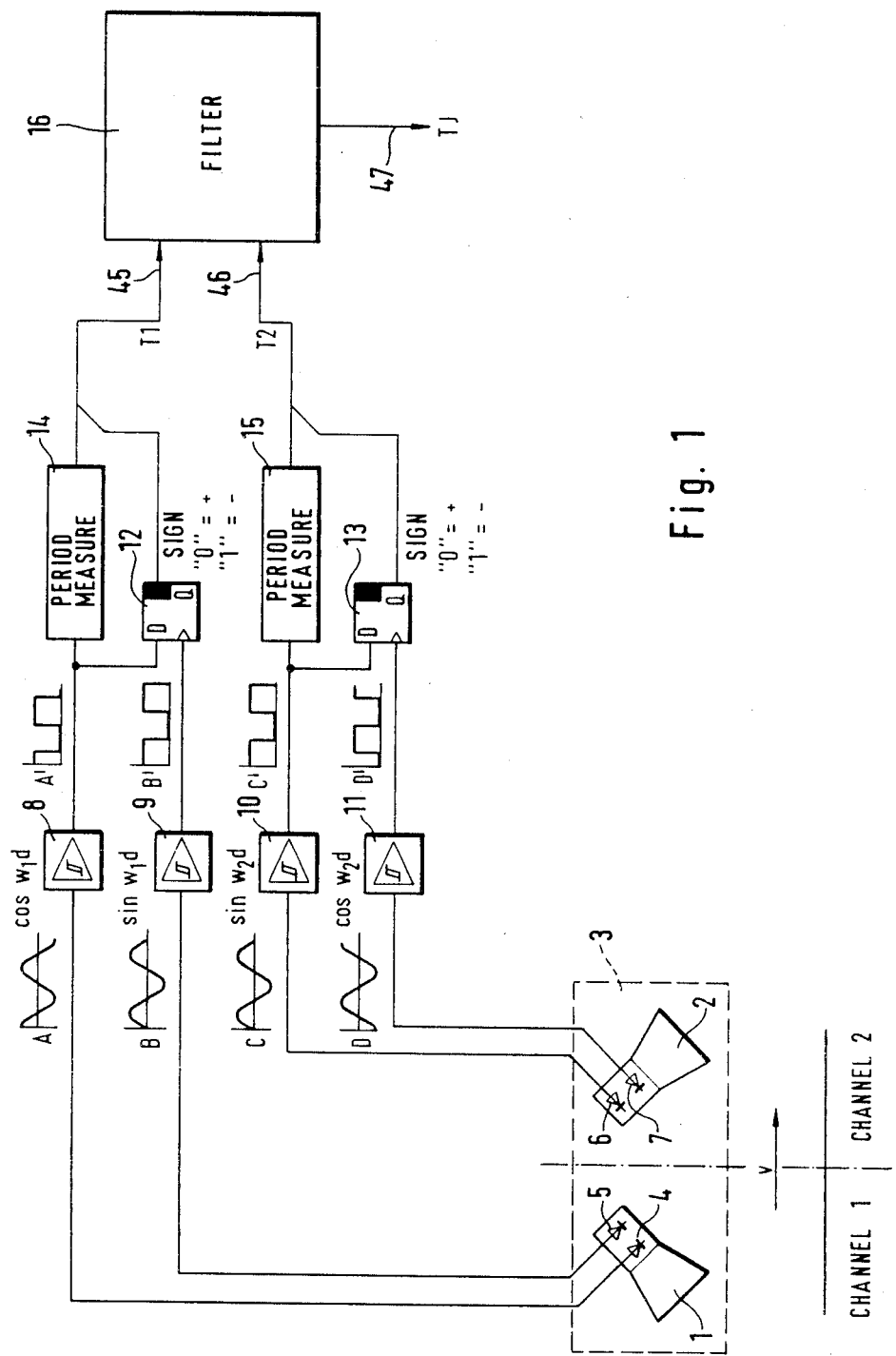
FIG. 1 is a greatly simplified block diagram of the device for the measurement of own speed.

The block diagram of FIG. 1 shows a two-channel device for measurement of own speed, having two substantially oppositely directed Doppler radar sensors 1 and 2 which are arranged in a so-called Janus head 3. The Janus head is firmly attached to a vehicle (not shown) and is moved with the vehicle in the direction of travel v. Each of the two Doppler signal sensors contains a quadrature mixer, indicated by the mixer diodes 4, 5 and 6, 7. This arrangement affords the best prerequisite for minimizing the influences of pitching and movements in height of the vehicle.

The evaluation of the Doppler frequency measured values which are filtered out from the mixed products of the quadrature mixers and are shown by the time curves A, B, C, D in FIG. 1 takes place in the manner that the Doppler frequency measured values are first of all fed to Schmitt triggers 8 to 11 in which the oscillations of the Doppler frequency measured values are converted into corresponding square pulses A', B', C', D'. Two D flip-flops 12, 13 are provided for the formation of the sign signals which indicate the direction of travel of the vehicle. The output of the Schmitt trigger 8 is, in this case, connected to a D-input of the D flip-flop 12 and one output of the Schmitt trigger 9 to a dynamic input of the same D flip-flop. One output of the Schmitt trigger 10 is connected to the D-input of the D flip-flop 13, the dynamic input of which is acted on by the output of the Schmitt trigger 11.

Furthermore, one output of the Schmitt trigger 8 is connected to an input of a converter 14 for measurement of the period and one output of the Schmitt trigger 10 is connected to another converter 15 for the measurement of the period. In the converters for measurement of the period, the digital Doppler signal measured values are obtained as binary numbers. Supplemented by the sign signals, they are fed separately for each channel to an evaluation device, generally designated 16.

The evaluation device contains, for each channel, a storage chain which can be formed, in particular, by a shift register, as well as a sorter by which a defined number m of discrete Doppler signal measured values are evaluated for the formation of the median of this Doppler signal measured value sequence.

Figure 2:
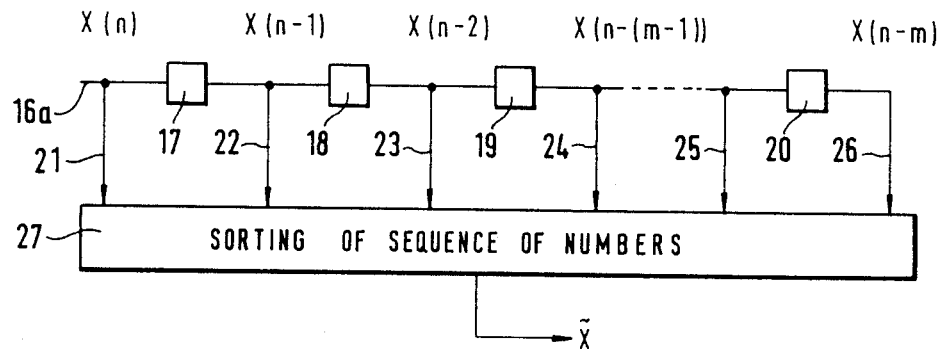
FIG. 2 is a diagrammatic showing of a part of the evaluation device indicated in FIG. 1, namely the part for the determination of the median.

A corresponding part for one channel of the evaluation device is shown diagrammatically in FIG. 2. The digital Doppler signal measured values $X(n)$, $X(n-1)$, etc. are pushed through on a line 16a. $X(n)$ represents means in this connection for the nth Doppler signal measured value. Time-delay elements 17-20 provide that the successive Doppler signal measured values are, in each case, delayed by one measurement interval. At the outputs 21-26 of the line 16a there are therefore present, parallel to each other, the m measured values of Doppler signal which are sorted in the sorter 27. The sorter is constructed in detail in such a manner that the sequence of the m Doppler signal measured values is sorted into a new sequence of ascending value and the median (central value $X^{18}$) present at the central place is formed from the ascending sequence.

Figure 3:
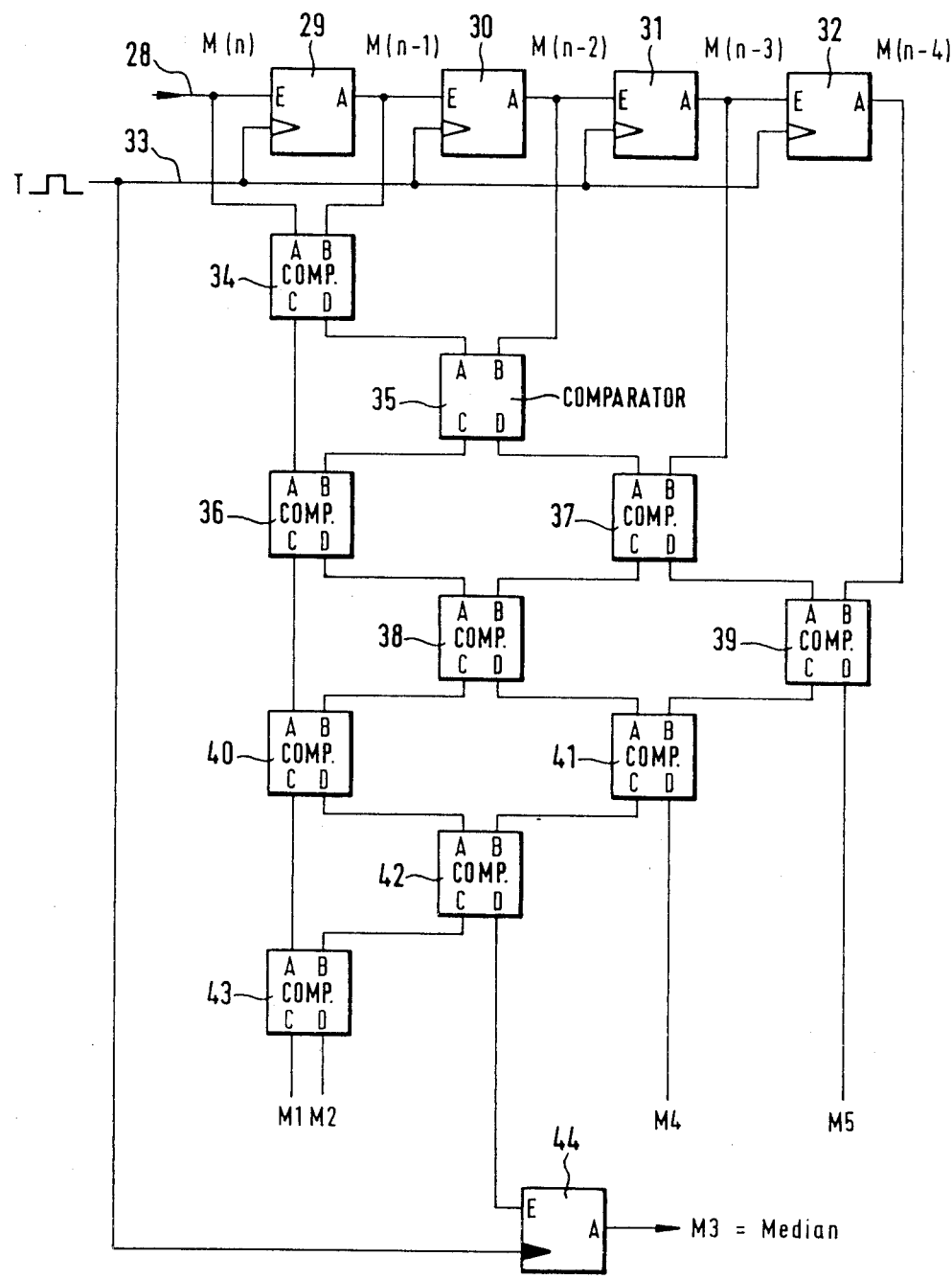
FIG. 3 is a diagrammatic showing of a part of the evaluation device indicated in FIG. 1, namely the part for the determination of the median in another embodiment.

Further details are shown in FIG. 3 in an embodiment of a part of the evaluation device for the formation of the median. This deals with a portion of the electrical circuitry for one of the two channels. The time delay is developed by a shift register having the input 28 and the storages 29–32, the dynamic input of which is jointly connected via a shift-pulse line 33 with shift pulses which occur upon each measurement interval. The storages 29–32 form a shift register for five measured values. The measured-value range is therefore m=5 (the measured values are designated here by M). In the individual storages the inputs are designated E and the outputs A. The outputs of the storages for the Doppler signal measured values M(n−1) to M(n−4) and the measured value M(n) are connected to the actual sorter, which is formed by the arrangement of comparators 34–43 shown in FIG. 3. The comparators are in each case so constructed that an input A is connected to an output D and an input B to an output C if the digital value at input A is larger than the digital value at input B. However, if this condition is not satisfied, input A is connected to output C and input B to output D.

The symbols indicated in FIG. 3 have the following meaning:

T = Shift pulse
M(n) = nth measured value
M1–M5 = sorted measured value sequence M1<M2<M<M4<M5
M3 = Median It is directly evident from the showing of the connection in FIG. 3 and the indicated function of the comparators 34–43 how a re-grouped sequence of Doppler signal measured values M1–M5 of ascending value is formed from the output signals of the storages 28–32. The central value M3 is read from the comparator 42 and stored in a median storage 44. (Since, of the sorters and median filter shown in FIG. 3, only the output variable M3 of the median storage 44 is of interest, and the comparator 43 can be dispensed with.)

The evaluation device (16) in FIG. 1 comprises, for each of the two inputs 45, 46, a sorter having a storage in accordance with FIG. 3 in which the digital Doppler signal measured value T1 or T2 is smoothed in accordance with the median averaging method.

The evaluation device (16) furthermore comprises an arithmetic-mean former (not shown) which forms the arithmetic mean from the medians T1 and T2. On one output (47) of the evaluation device (16) there is thus present a digital signal having the period of the resultant Doppler frequency from both channels. This period is designated Tj. It can be converted by a further converter (not shown in FIG. 1) into a velocity signal of the own speed. This converter produces the proportional relationship between the mean Doppler frequency derived from the period Tj and the own speed of the vehicle.

The method of measuring the own speed is evident from the above description of the device.

Figure 4:
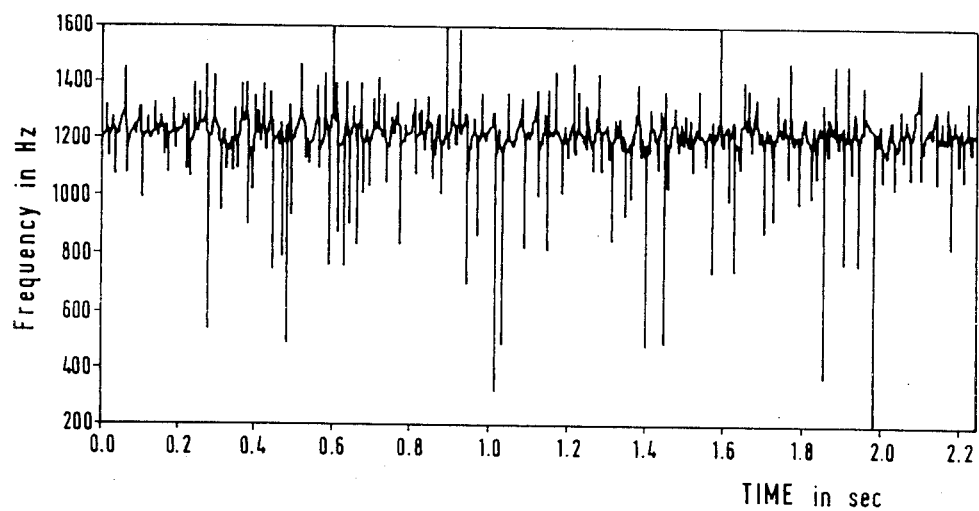
FIG. 4 is a time graph of the Doppler frequency measured, without median formation.
Figure 5:
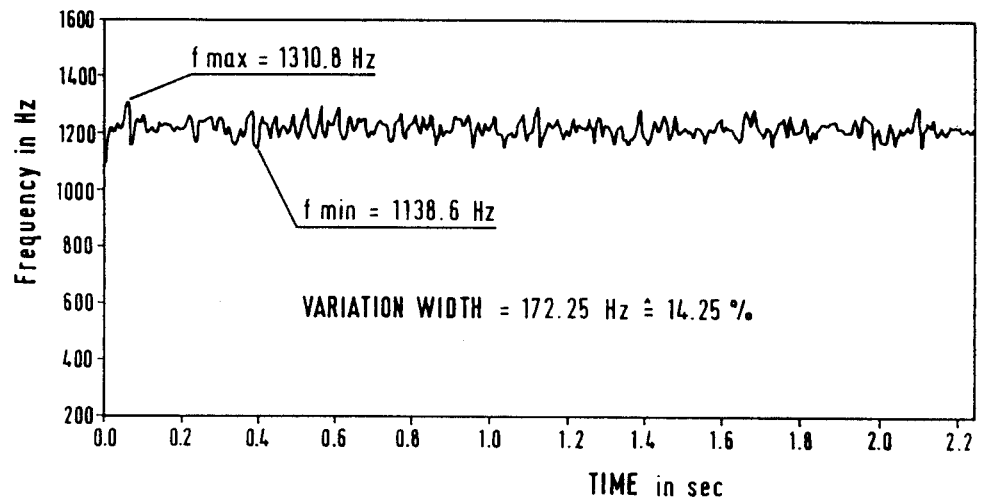
FIG. 5 is a showing similar to FIG. 4 but with formation of the median of the Doppler frequency measured.

FIGS. 4 and 5 show the smoothing effect of the formation of the median from measured Doppler frequencies, the median representing the mean Doppler frequency with little variation over the course of the continuing evaluation.

FIG. 4 shows, in detail, the result of the frequency measurement from a radar signal (single-channel) in which the frequency fluctuates very strongly around the theoretical mean Doppler frequency of 1,209 Hz. Characteristic are small pulses, the peaks of which deviate up to 90% from the mean Doppler frequency.

FIG. 5, on the other hand, shows the corresponding signal curve after formation of the median over eleven discrete Doppler signal measured values of a sequence. A clear reduction in the fluctuations around the mean Doppler frequency, which is controlling for the own speed and a clear suppression of the extreme values of the Doppler signal measured values can be noted. By comparison of the signal curves in FIGS. 4 and 5 it is clear that the smoothing of the Doppler signal measured values which a permit correspondingly precise determination of the own speed. It can be noted that the signal curved of FIG. 5 is based on more measurements than is provided by the circuitry of FIG. 3 inasmuch as FIG. 3 only provides for the formation of the median from a number, M=5, of measured values. The accuracy is improved with increasing number of measured values.

The Doppler signal sensors 1 and 2, the Schmitt triggers 8–11, the D flip-flops 12 and 13 and the converters 14 and 15 shown in FIG. 1 are constructed in accordance with the prior art and function in a manner known per se. The converters 14, 15 determine in each case the period of the Doppler signal measured values. The frequency can then be determined—in this case after formation of the median and the mean—from the reciprocal of the measured period. The D flip-flops 12 and 13, which are constructed in accordance with the prior art, represent the storage which takes over the condition of the D-input when a logical "1" is present at the pulse input or dynamic input. The information from the D-input is maintained at an output Q (see FIG. 1) until the signal at the pulse input is "1" and at the D input is "0". As a whole, the D. flip-flop determines whether signal A' or B' lags with respect to the other signal in each case and it gives off at its output Q or inverted Q a corresponding sign signal which is a criterion for the direction of travel of the vehicle.

As example of the smoothing of the Doppler signal measured values one can start from the following sequence of numbers:

5  6  8  3  2  −100  10.

The new sequence in which the Doppler signal measured values are grouped in accordance with their value is as follows:

−100  2  3  5  6  8  10.

From this the values results as median (central value).

By way of comparison with the prior art there is indicated the arithmetic mean which, in this case, amounts to −66/7 = −9.43 and thus differs greatly from the median.

Figure 6:
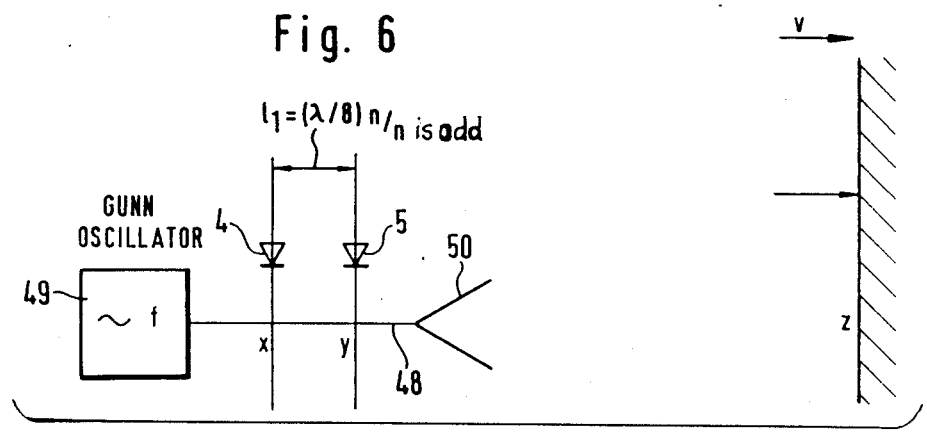
FIG. 6 is a diagrammatic showing of the quadrature mixer.

FIG. 6 shows how the mixer diodes, for instance 4, 5 of the quadrature mixer, are arranged staggered with respect to each other on the line 48 between on oscillator 49 and an antenna 50. The distance $l_1$ between the couplings of the two mixer diodes 4 and 5 at the places x and y of the line 48 is in this case an odd multiple of $\lambda/8$. In FIG. 6 the reflection target, i.e., the ground, with respect to which the antenna 50 moves with the speed v is designated z.

It is noted that the principles of the invention apply with transmission of microwave radiation including electromagnetic, and sonic radiation, the electromagnetic radiation including the usual radar frequencies as well as the optical portion of the spectrum. The preferred embodiment of the invention employs X-band or K-band electromagnetic radar frequencies.

I claim:

1. A method of measuring a vehicle's own speed by the principle of the Doppler radar, comprising transmitting microwave radiation as a transmitted signal at a transmission frequency from the vehicle, a portion of the radiation being reflected back to the vehicle as a reflected radiation;

receiving the reflected radiation as a received signal at a received frequency which includes, during motion of the vehicle, Doppler frequencies which shift the received frequency from the transmission frequency;

mixing the received signal with a sample of the transmitted signal to produce a mixed signal having the Doppler frequencies;

forming pulses of the mixed signal and evaluating the pulses of mixed signal as Doppler pulse signals by frequency measurement in the time range and of direction-of-travel evaluation, in order to form digital Doppler signal values;

obtaining a sequence of Dobbler frequency measurements;

selecting a median value of Doppler frequency measurement from the sequence; and wherein the value of the median $M(n-3)$ is continuously determined from a predetermined number of last-generated digital Doppler signal values of the sequence, the sequence being $M(n-1)$, $M(n-2)$, $M(n-3)$, $M(n-4)$, $M(n-5)$ in order to determine an average Doppler period.

2. A method for measuring a vehicle's own speed by the Doppler principle, comprising generating a forward signal and a reverse signal to be transmitted respectively in the direction of travel and in a direction opposite the direction of travel; and with respect to the forward and the reverse signals, performing the following steps transmitting microwave radiation as a transmitted signal at a transmission frequency from the vehicle, a portion of the radiation being reflected back to the vehicle as a reflected radiation;

receiving the reflected radiation as a received signal at a received frequency which includes, during motion of the vehicle, Doppler frequencies which shift the received frequency from the transmission frequency;

mixing the received signal with a sample of the transmitted signal to produce a mixed signal having the Doppler frequencies;

forming pulses of the mixed signal and evaluating the pulses of mixed signal as Doppler pulse signals by frequency measurement in the time range and of direction-of-travel evaluation, in order to form digital Doppler signal values, obtaining a sequence of Dobbler frequency measurements;

selecting a median value of Doppler frequency measurement from the sequence; and wherein the value of the median $M(n-3)$ is continuously determined from a predetermined number of last-generated digital Doppler signal values of the sequence, the sequence being $M(n-1)$, $M(n-2)$, $M(n-3)$, $M(n-4)$, $M(n-5)$ in order to determine an average Doppler period;

the method further comprising steps of determining the vehicle speed in the direction of travel by use of a mean Doppler period; and wherein said step of determining the vehicle speed includes forming the arithmetic mean from a first median value obtained from said forward signal and a second median value obtained from said reverse signal.

3. A device for the measurement of the own speed of a vehicle, the device comprising a Doppler radar sensor carried by the vehicle, and providing transmitted and received microwave signals;

a mixer which mixes said transmitted and said received signals a pulse former connected to an output of the mixer;

a period measuring device which is connected to an output of the pulse-former and produces one digital Doppler frequency value for each digitalized period;

an oscillator and an antenna;

a median filter and a shift register circuit; and an evaluation device which is connected to an output of the period measuring device for determining a mean value for the speed sought from a predetermined number of Dopper frequency values; and wherein said evaluation device includes a median filter responsive to a sequence of input signals, the filter acting in sliding fashion on the input signals by a continuous sequence of digital Doppler frequency measured values.

4. A measurement device according to claim 3, wherein the median filter is connected to the shift register circuit, the shift register circuit having an input which is connected to the filter for receiving the digital Doppler frequency measured values and wherein shift register stages of the shift register circuit are shifted upon each measurement interval by one shift pulse;

the median filter comprises comparators the inputs of which are so connected to the outputs of the shaft register stages as well as to each other to filter out the digital Doppler frequency measured value which represents the median value from the Doppler frequency measured values stored in the shift register stages.

5. A measurement device according to claim 3, further comprising a sign discriminator; and wherein said mixer is a quadrator mixer, said mixer comprising two mixer diodes which are coupled, staggered by an odd-number multiple of $\lambda/8$ at the transmission frequency, on a conductor in the Doppler radar sensor between the oscillator and the antenna; and two Doppler signals of both mixer diodes are fed into said discriminator for generating a sign signal which corresponds to the phase relationship between the Doppler signals, the sign signal being fed together with the corresponding digital Doppler frequency value of the evaluation device having the median filter.

6. A measurement device according to claim 5, wherein the sign discriminator comprises a D flip-flop having a static input and a dynamic input, the inputs being connected to respective ones of the two mixer diodes.

7. A measurement device according to claim 6, wherein said radar sensor is a two-channel radar sensor;

there is a second mixer with both mixers being quadrature mixers and connected in respective ones of said channels;

there is a second sign discriminator, the discriminators being connected in respective ones of the channels and connected to the evaluation device;

there is a second median filter, the filters being connected in respective ones of the channels;

the measurement device further comprises two period measurement devices located in respective one of said channels and connected to the evaluation device; and an arithmetic-mean former, outputs of the median filters being connected to the arithmetic-mean former, the mean value of which is a measure of the own speed (horizontal speed) sought.

* * * * *